(12) United States Patent
Ha

(10) Patent No.: US 10,399,293 B2
(45) Date of Patent: Sep. 3, 2019

(54) OIL EXTRACTOR

(71) Applicant: L'EQUIP CO., LTD, Hwaseong (KR)

(72) Inventor: Weh Gu Ha, Hwaseong (KR)

(73) Assignee: L'EQUIP CO., LTD, Hwaseong (KR)

(*) Notice: Subject to any disclaimer, the term of this patent is extended or adjusted under 35 U.S.C. 154(b) by 336 days.

(21) Appl. No.: 15/529,304

(22) PCT Filed: Jul. 2, 2015

(86) PCT No.: PCT/KR2015/006821
§ 371 (c)(1),
(2) Date: May 24, 2017

(87) PCT Pub. No.: WO2016/085080
PCT Pub. Date: Jun. 2, 2016

(65) Prior Publication Data
US 2017/0259517 A1 Sep. 14, 2017

(30) Foreign Application Priority Data
Nov. 25, 2014 (KR) .......................... 10-2014-0165157

(51) Int. Cl.
*A47J 19/00* (2006.01)
*A23N 1/00* (2006.01)
(Continued)

(52) U.S. Cl.
CPC ................ *B30B 9/122* (2013.01); *A23D 9/00* (2013.01); *A23D 9/02* (2013.01); *A23N 1/02* (2013.01);
(Continued)

(58) Field of Classification Search
CPC ........ A47J 19/025; A47J 19/027; A47J 19/06; A23N 1/02; B30B 9/12
(Continued)

(56) References Cited

U.S. PATENT DOCUMENTS 2,048,791 A * 7/1936 Gilliatt ...................... B30B 9/12
100/148
5,592,873 A * 1/1997 Lee ........................ A47J 19/025
99/510
(Continued)

FOREIGN PATENT DOCUMENTS

| KR | 10-2002-0057736 A | 7/2002 |
| KR | 10-0752957 A | 8/2007 |
| KR | 10-0866576 B1 | 11/2008 |

*Primary Examiner* — Reginald Alexander
(74) *Attorney, Agent, or Firm* — Patent Office of Dr. Chung Park

(57) ABSTRACT

An oil extractor that includes: a main body housing; a motor; a feed hopper detachably coupled to the upper end of the main body housing to feed grain; a shell that communicates with the lower end of the feed hopper to receive the grain and is detachably coupled to one side of the main body housing; a screw shaft inserted into the shell and having an end portion that passes through one side of the main body housing and is coupled to the motor; a fastening means for detachably coupling the shell to the main body housing; and a shell cover surrounding the shell. The shell cover has a groove formed on its lower portion for receiving the shell and is supported by the main body housing and moves between a first position at which the shell is covered and a second position at which the shell is exposed.

6 Claims, 10 Drawing Sheets

(51) Int. Cl.
   *B30B 9/12*      (2006.01)
   *A23N 1/02*      (2006.01)
   *A23D 9/00*      (2006.01)
   *A23D 9/02*      (2006.01)
   *A47J 43/046*    (2006.01)
   *A47J 43/07*     (2006.01)
   *A47J 27/00*     (2006.01)
   *C11B 1/06*      (2006.01)
   *A47J 19/02*     (2006.01)

(52) U.S. Cl.
   CPC ........... *A47J 19/025* (2013.01); *A47J 27/004* (2013.01); *A47J 43/046* (2013.01); *A47J 43/0716* (2013.01); *B30B 9/12* (2013.01); *C11B 1/06* (2013.01); *A47J 19/027* (2013.01)

(58) Field of Classification Search
   USPC ........... 99/495, 510, 513, 502; 100/117, 148
   See application file for complete search history.

(56) References Cited

U.S. PATENT DOCUMENTS

| | | | | |
|---|---|---|---|---|
| 5,680,812 A | * | 10/1997 | Linsgeseder | A23N 1/00 100/148 |
| 8,863,656 B2 | * | 10/2014 | Trovinger | A23N 1/02 100/117 |
| 2014/0245906 A1 | * | 9/2014 | Lee | A47J 19/025 99/510 |

* cited by examiner

OIL EXTRACTOR

TECHNICAL FIELD

The present invention relates to an oil extractor for extracting oil from grains, and more particularly, to an oil extractor for compressing grains through a screw shaft to isolatedly discharge oil and remnants.

BACKGROUND ART

Generally, oil for eating is extracted from grains or seeds for oil extraction like sesame seeds, perilla seeds, and sunflower seeds, and in this case, such grains are roasted and then compressed, so that they are extracted to the form of oil. In conventional practices, press means is used to compress the grains with a large pressure so as to extract oil from the grains, but such press means is installed only on a place where large-scale equipment is provided like a mill. Recently, a screw type oil extractor for household purposes has been introduced to compress a small quantity of grain successively fed thereto.

The conventional screw type oil extractor generally includes a cylindrical shell located in a main body casing, feed means for supplying grains for oil extraction to the interior of the shell, a screw disposed in the shell to which the feed means is connected to compressingly move the grains therealong, and a heater for heating the shell to a given temperature.

According to the conventional screw type oil extractor having the above-mentioned configuration, by the way, the screw inserted into the shell is mounted integrally with a motor shaft, so that so as to clean the interior of the shell, the main body casing having the screw is disassembled and next, the shell mounted on the outside of the screw is separated, thereby making it difficult to often clean the interior of the shell.

To solve the above-mentioned problems, accordingly, there are proposed Korean Patent Registration No. 10-0752957 (entitled 'oil expeller') and Korean Patent Application Laid-open No. 2002-0057736 (entitled 'oil expeller machine') wherein the oil expeller is provided separately from a food processor (juice extractor body) onto which a motor is mounted, and the oil expeller includes a shell assembly having a heater mounted thereon, a screw, and a casing in which the shell assembly and the screw are located, so that if the casing is coupled to the juice extractor body, one end (a shank portion) of the screw is detachably connected to the motor shaft.

In case of the conventional oil expeller, however, the casing has to be inconveniently disassembled so as to clean the interior of the shell. On the other hand, coupling means for coupling the casing to the food processor (juice extractor body) is complicated in configuration and it is inconvenient to perform the coupling work. So as to drive the heater disposed in the casing upon the coupling between the juice extractor body and the oil expeller, further, the plug of the power supply cord connected to the heater has to be inconveniently connected to the socket of the juice extractor body.

DISCLOSURE

Technical Problem

Accordingly, the present invention has been made in view of the above-mentioned problems occurring in the prior art, and it is an object of the present invention to provide an oil extractor that is simple in configuration and allows the interior of a shell to be conveniently and easily cleaned.

Technical Solution

To accomplish the above-mentioned object, according to the present invention, there is provided an oil extractor including: a main body housing having a motor embedded therein; a feed hopper detachably coupled to the top end periphery of the main body housing to feed grains for oil extraction; a shell detachably coupled to one side of the main body housing in such a manner as to communicate with the lower end of the feed hopper to receive the grains for oil extraction from the feed hopper; a screw shaft adapted to be inserted into the shell and having an end portion passing through one side of the main body housing in such a manner as to be coupled to the motor; fastening means for detachably coupling the shell to the main body housing; and a shell cover adapted to surround the shell, having an accommodation groove formed on the lower portion thereof to accommodate the shell thereinto, and supported against the main body housing in such a manner as to be movable in position between a first position at which the shell is covered and a second position at which the shell is exposed.

According to the present invention, desirably, the shell cover includes a heating part disposed in the interior thereof to heat the shell.

According to the present invention, desirably, the heating part includes a heater as a heating source and a heater block adapted to surround the heater in such a manner as to come into contact with the heater, and when the shell cover is at the first position, the underside surface of the heater block comes into contact with at least a portion of the top peripheral surface of the shell, so that the heat of the heater is transferred to the shell.

According to the present invention, desirably, the underside surface of the heater block has a hemispherical shape so that the heater block covers the upper hemispherical portion of the shell.

According to the present invention, desirably, the fastening means includes: a cylindrical buckle base fixedly disposed around a through-hole formed one side portion of the main body housing and having a plurality of guide grooves formed spaced apart from each other by a given distance along the outer peripheral surface thereof; a cylindrical buckle rotatably moving along the outer peripheral surface of the buckle base to a third position at which the shell is fastened to the main body housing and to a fourth position at which the fastening of the shell is released and having a plurality of fastening protrusions protruding inwardly from the outer peripheral surface thereof in such a manner as to be spaced apart from each other by a given distance; and insertion protrusions protruding from one end portion of the shell in a circumferential direction in such a manner as to be spaced apart from each other by a given distance and inserted into the plurality of guide grooves of the buckle base, and when the buckle is at the third position, the plurality of fastening protrusions is located at the position facing the plurality of insertion protrusions, so that the movement of the plurality of insertion protrusions is constrained.

According to the present invention, desirably, the buckle includes a lever protruding from one side of the outer peripheral surface thereof so as to perform the rotatable movements of the buckle to the third position and to the fourth position, and a portion of upper end portion of the lever is exposed to the outside of the top end of the main body housing so as to be manipulated by a user.

Advantageous Effects

According to the present invention, the oil extractor is configured wherein the shell cover having the heating part is foldable, and in the state where the shell cover is folded, accordingly, the shell and the screw shaft are fastened or unfastened to or from the main body housing only by means of the manipulation of the lever, so that the whole configuration of the product is simple and it is very convenient and easy to clean or repair the interior of the shell.

BEST MODE FOR INVENTION

Objects, characteristics and advantages of the present invention will be more clearly understood from the detailed description as will be described below and the attached drawings. Hereinafter, an explanation on an oil extractor according to the present invention will be in detail given with reference to the attached drawing.

Figure 1:
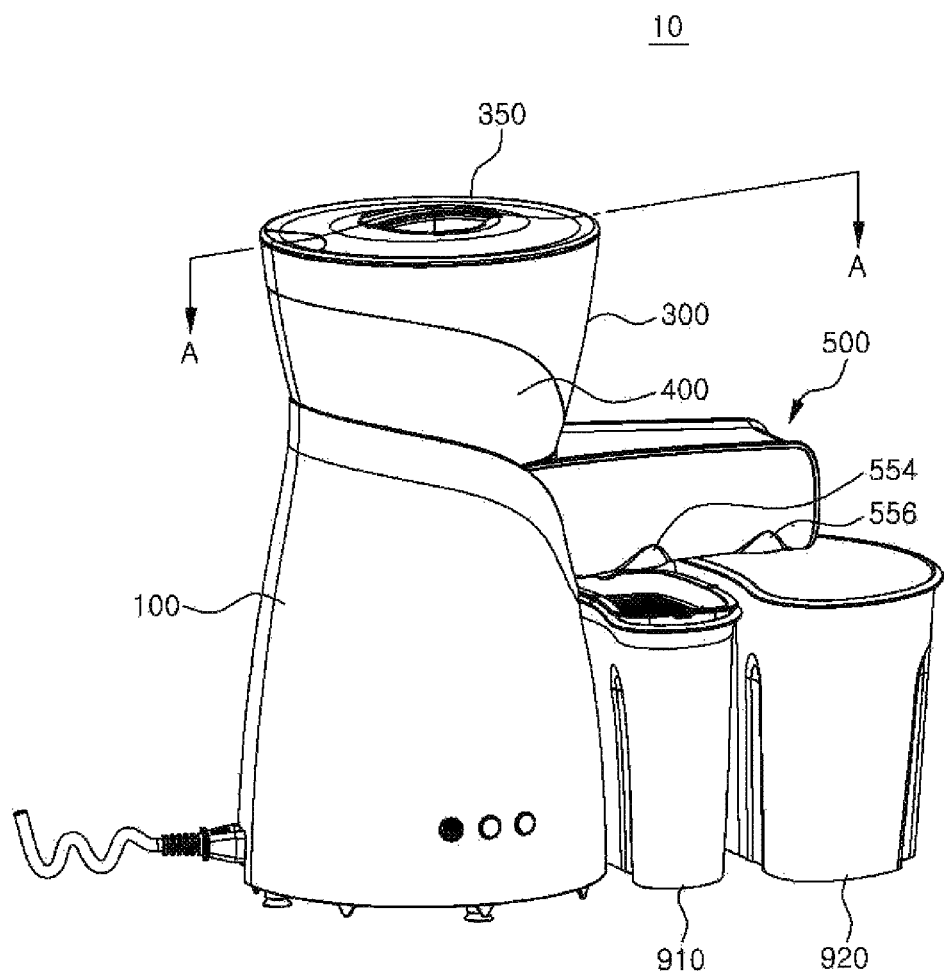
FIG. 1 is a perspective view showing an oil extractor according to the present invention.
Figure 2:
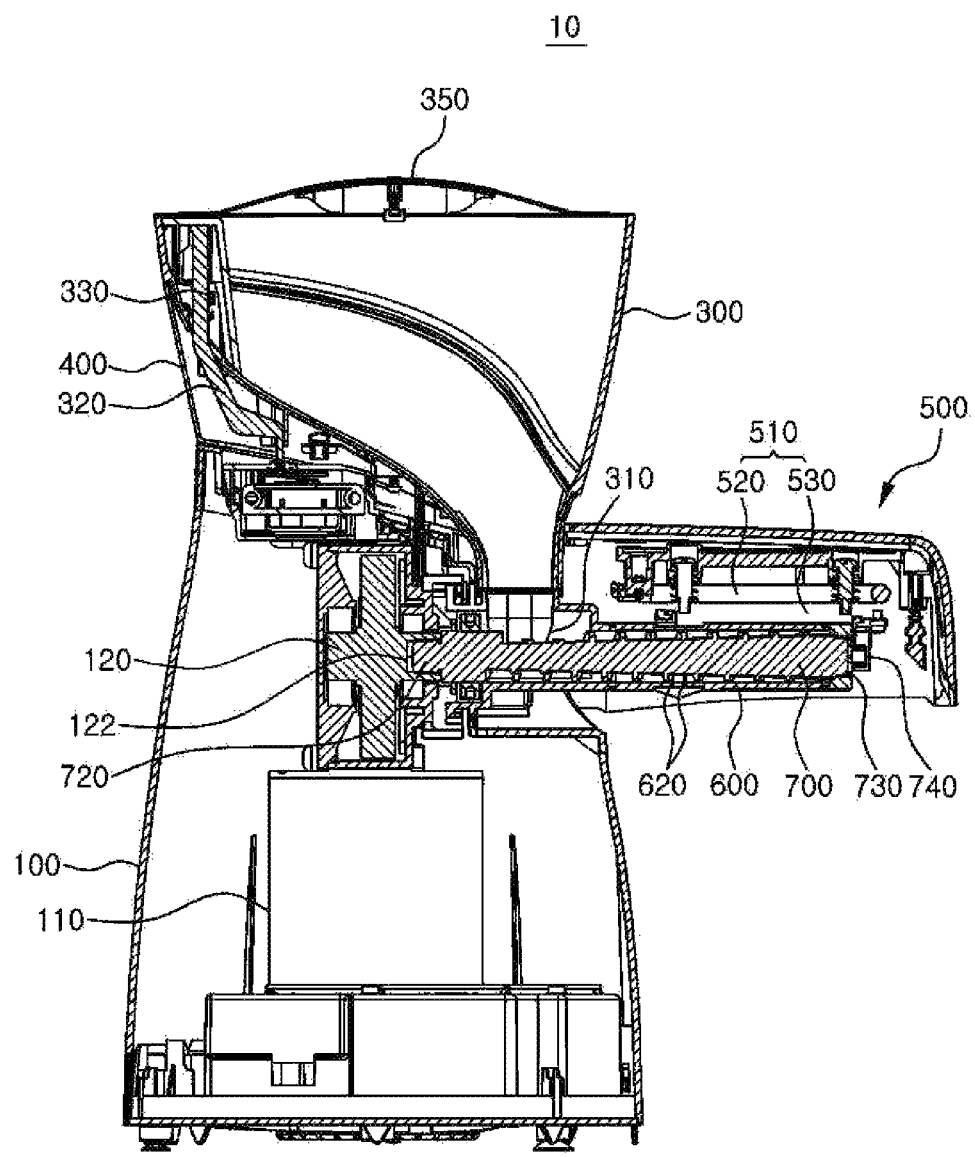
FIG. 2 is a sectional view taken along the line A-A of FIG. 1.

FIG. 1 is a perspective view showing an oil extractor according to the present invention, and FIG. 2 is a sectional view taken along the line A-A of FIG. 1.

Referring to FIGS. 1 and 2, an oil extractor 10 according to the present invention includes a main body housing 100 having a motor 110 embedded therein, a feed hopper 300 detachably coupled to the top end periphery of the main body housing 100 to feed grains for oil extraction, a shell 600 detachably coupled to one side of the main body housing 100 in such a manner as to communicate with the lower end of the feed hopper 300 to receive the grains for oil extraction from the feed hopper 300, a screw shaft 700 adapted to be inserted into the shell 600 and having an end portion passing through one side of the main body housing 100 in such a manner as to be coupled to the motor 110, fastening means for detachably coupling the shell 600 to the main body housing 100, and a shell cover 500 adapted to surround the shell 600.

The grains for oil extraction fed to the feed hopper 300 are introduced into the shell 600 and then pass through the shell 600 by means of the screw shaft 700 disposed inside the shell 600, so that they are extracted to the form of oil.

At this time, the shell 600 is heated by means of a heating part 510 disposed at the interior of the shell cover 500, and accordingly, the grains for oil extraction are roasted and at the same time extracted by means of the inner peripheral surface of the shell 600 to the form of oil.

The oil separated from the grains flows along the internal flow of the shell 600 and is then discharged to the outside. In this case, the oil is collected to an oil storage container 910 located under the shell 600, and the grain remnants are collected to a remnant storage container 920 located under the shell 600.

At this time, the oil storage container 910 and the remnant storage container 920 are not contained in the components of the oil extractor 10 according to the present invention.

Now, an explanation on the respective components of the oil extractor 10 according to the present invention will be in detail given.

The feed hopper 300 is open on the top thereof and has a cap 350 detachably coupled to the top thereof. Accordingly, the cap 350 is open by a user to allow the grains for oil extraction to be fed to the feed hopper 300.

The feed hopper 300 becomes small in width as it goes toward the lower portion thereof and has an inlet 310 formed on the lower end periphery thereof.

The inlet 310 is inserted into a material inlet 610 (See FIGS. 4 and 8) of the shell 600, so that the grains for oil extraction fed to the feed hopper 300 are introduced into the shell 600 through the inlet 310.

A main body cover 400 is disposed on the lower peripheral surface of the feed hopper 300 to seat the feed hopper 300 onto the main body housing 100, so that the feed hopper 300 is detachably coupled to the top end periphery of the main body housing 100 in the state of being seated onto the main body cover 400.

According to the present invention, the feed hopper 300 and the main body cover 400 are provided as individual components, but they are not limited thereto. That is, the feed hopper 300 and the main body cover 400 may be formed as a unitary body which is detachably coupled to the main body housing 100.

A switch putter 320 is disposed on the interior of the side portion of the feed hopper 300 and passes through the main body cover 400 in such a manner as to be extended to the top end portion of the main body housing 100. If the cap 350 is closed, accordingly, the switch putter 320 is pressed down to turn a switch on, and if the cap 350 is open, the switch putter 320 is raised up by means of a spring to turn the switch off so that even if an operation button is pressed, the oil extractor 10 does not work.

The main body housing 100 is generally cylindrical and has the motor 110, a gearbox 120, and other power supply means (not shown) disposed in the interior thereof.

The gearbox 120 is coupled to top of the motor 110 to control revolutions per minute and has a coupling hole 122 formed to insert a shank portion 720 (See FIG. 8) of the screw shaft 700 thereinto.

On the other hand, the main body housing 100 has air inlet and outlet (not shown) formed on the underside surface thereof to allow the hot heat caused by the operation of the motor 110 to become cool.

On the other hand, the main body housing 100 has a through-hole 140 formed on one side top end portion thereof to pass the shell 600 in which the screw shaft 700 is embedded in such a manner as to be coupled to the motor 110 therethrough.

Figure 3:
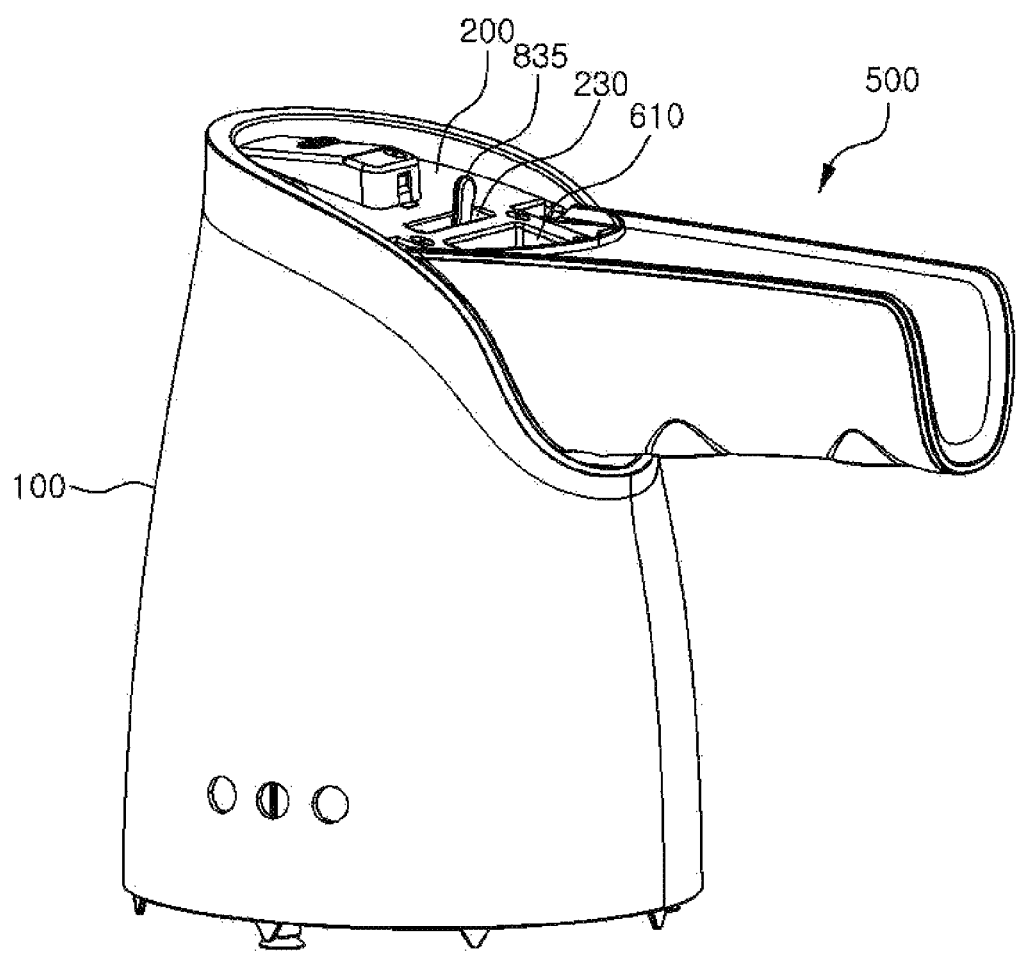
FIG. 3 is a perspective view showing a position (a first position) at which a shell cover moves down to cover a shell in the state where a feed hopper is removed from the oil extractor of FIG. 1.
Figure 4:
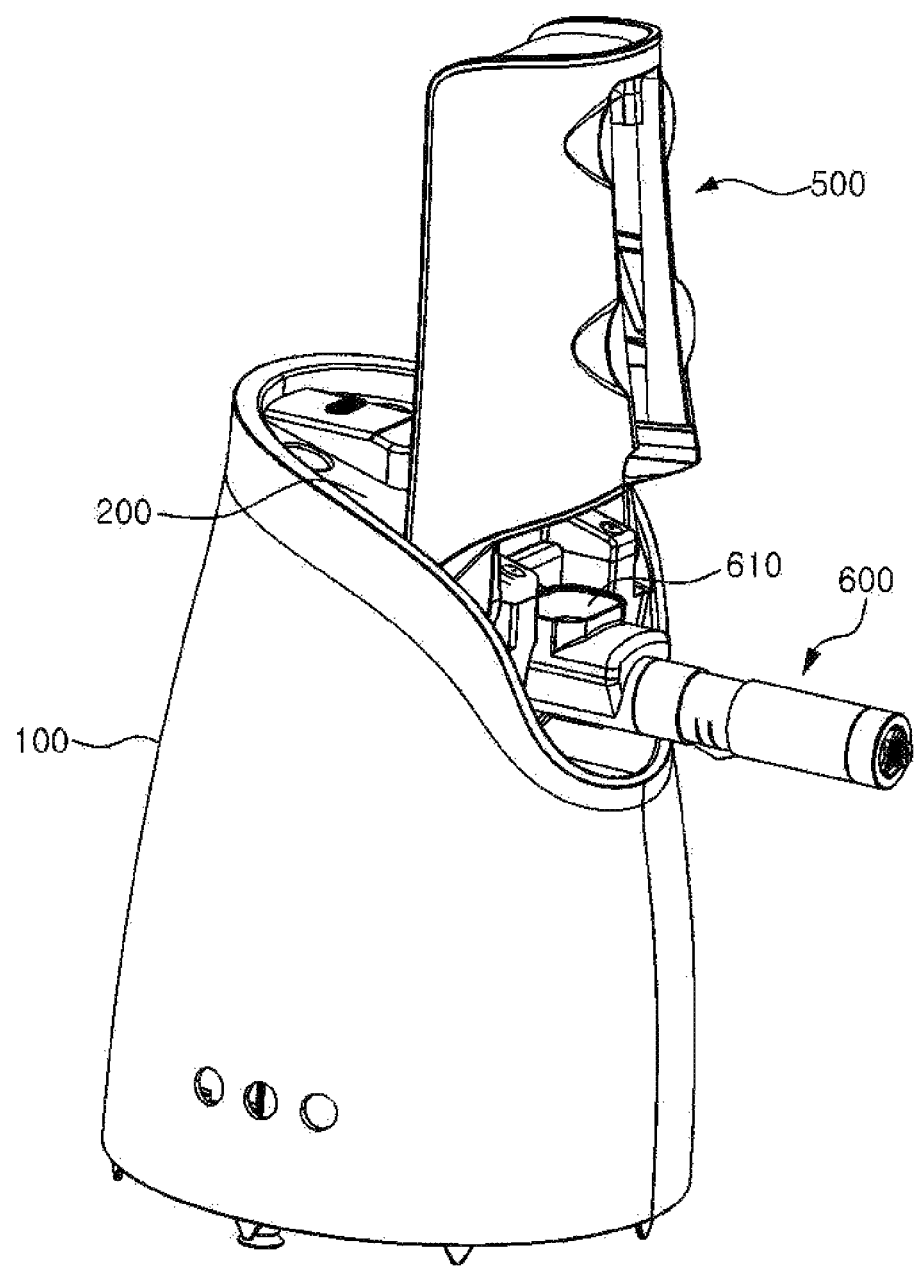
FIG. 4 is a perspective view showing a position (a second position) at which the shell cover moves up to expose the shell in the state where the feed hopper is removed from the oil extractor of FIG. 1.

FIGS. 3 and 4 are views showing the states wherein the feed hopper 300 and the main body cover 400 are removed from the oil extractor 10 of FIG. 1, wherein FIG. 3 is a perspective view showing a position (a first position) at which the shell cover moves down to cover the shell, and FIG. 4 is a perspective view showing a position (a second position) at which the shell cover moves up to expose the shell. Further, FIG. 5 is a perspective view showing the state where the shell cover of FIGS. 3 and 4 is separated from the main body housing of the oil extractor.

Figure 5:
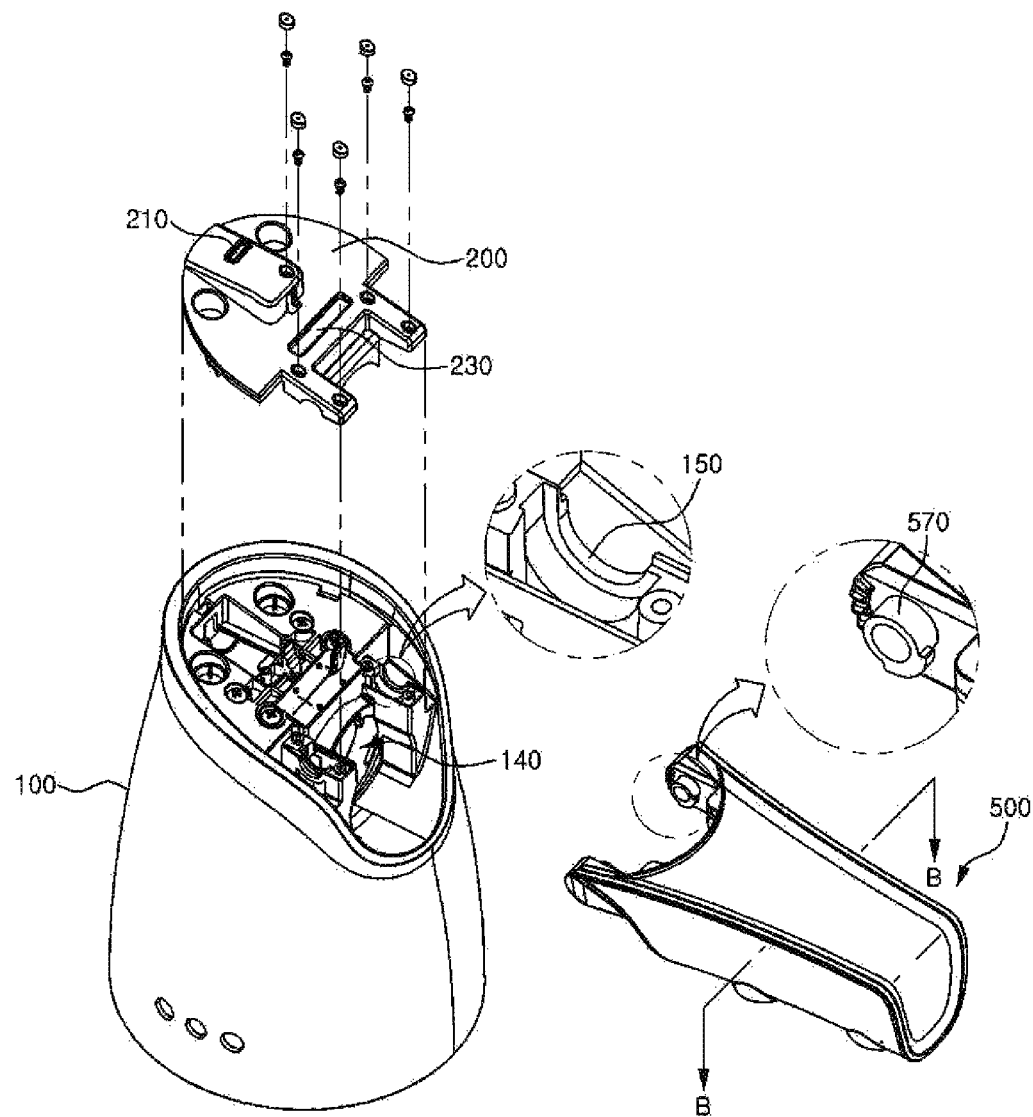
FIG. 5 is a perspective view showing the state where the shell cover is separated from a main body housing of the oil extractor according to the present invention.

As shown in FIGS. 3 to 5, a main body housing cover 200 is screw-coupled to the top end periphery of the main body housing 100.

The main body housing cover 200 has a putter through-hole 210 formed on one side portion (on the left side of the drawing) thereof in such a manner as to pass the lower end portion of the switch putter 320 therethrough and a lever through-hole 230 formed on the other side portion (on the right side of the drawing) thereof to pass a lever 835 of the fastening means as will be discussed later for fastening the shell 600 and the main body housing 100 to each other therethrough.

The main body housing cover 200 may be formed as a unitary body with the main body housing 100, but so as to perform easy repairing or maintenance checking, desirably, it is formed as a separate member from the main body housing 100.

The shell cover 500 is adapted to surround the shell 600 during the operation of the oil extraction and is supported against one side top end portion of the main body housing 100 in such a manner as to be movable in position between a first position (See FIG. 3) at which the shell 600 is covered and a second position (See FIG. 4) at which the shell 600 is exposed.

The shell cover 500 has hinge shafts 570 disposed on the end portion thereof in such a manner as to be inserted into shaft accommodation grooves 150 formed on the side portions of the main body housing 100, so that the shell cover 500 can be axially rotatable relative to the main body housing 100.

Upon the oil extraction of the oil extractor 10 or in normal cases, the shell cover 500 is located at the first position by the user, and if the interior of the shell 600 is cleaned, the feed hopper 300 is separated from the main body housing 100. Next, the shell cover 500 moves up and is then located at the second position, and after that, the shell 600 is separated from the main body housing 100.

So as to clean or repair the interior of the shell 600, accordingly, the feed hopper 300 is separated from the main body housing 100, and after the shell cover 500 moves up, next, the shell 600 is just separated from the main body housing 100, thereby being very effective in view of conveniences and time in working.

Figure 6:
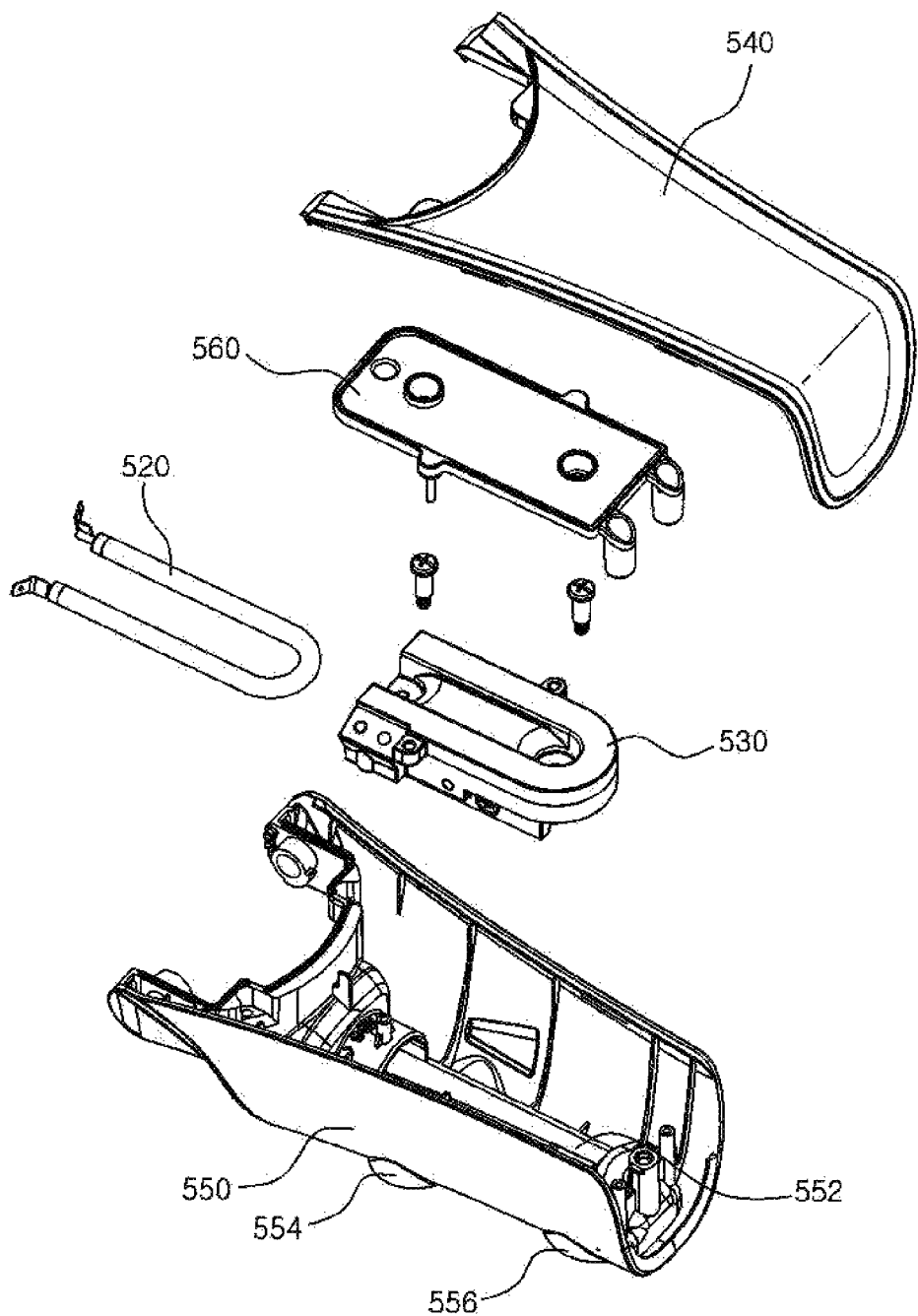
FIG. 6 is an exploded perspective view showing the shell cover of FIG. 5.
Figure 7:
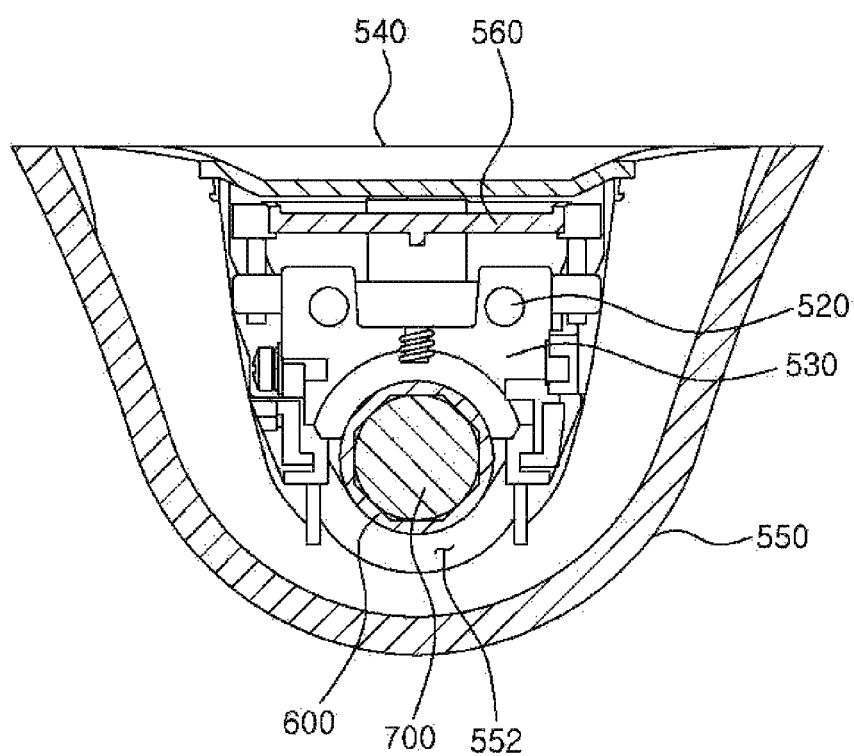
FIG. 7 is a sectional view taken along the line B-B of FIG. 5.

FIG. 6 is an exploded perspective view showing the shell cover of FIG. 5, and FIG. 7 is a sectional view taken along the line B-B of FIG. 5.

The shell cover 500 includes a lower case 550 having a given length in a height direction thereof to form a given space at the interior thereof and an upper case 540 adapted to cover the lower case 550.

Further, the lower case 550 has an accommodation groove 552 formed on the lower portion of the center thereof in a longitudinal direction thereof to accommodate the shell 600 therein, and the shell cover 500 further includes a heating part 510 disposed in the interior of the lower case 550 to heat the shell 600.

The heating part 510 includes a heater 520 as a heating source and a heater block 530 adapted to surroundingly accommodate the heater 520 therein.

According to the present invention, the heater 520 has a general 'U'-shaped plane, and accordingly, the heater block 530 has the shape of a plane corresponding to the plane of the heater 520.

The heater block 530 is adapted to surround the heater 520 in such a manner as to come into contact with the heater 520, and accordingly, it is made of a metal material having good thermal conductivity, for example, aluminum.

When the shell cover 500 is at the first position, the underside surface of the heater block 530 comes into contact with at least a portion of the top peripheral surface of the shell 600, so that the heat of the heater 520 is transferred to the shell 600.

So as to allow the heat of the heater 520 to be transferred well to the shell 600, it is important to appropriately adjust the contacted area between the heater block 530 and the shell 600, and as the shell 600 has a cylindrical shape, in this case, the underside surface of the heater block 530 desirably has a hemispherical shape for covering the upper hemispherical portion of the shell 600.

Further, the shell cover 500 further includes a heat blocking plate 560 disposed above the heater block 530 to support the heater block 530 against the lower case 550 and at the same time to block the heat generated from the heater 520.

Even if not shown, further, a temperature sensor and a controller for controlling the temperature sensor may be disposed in the interior of the heater block 530.

Figure 8:
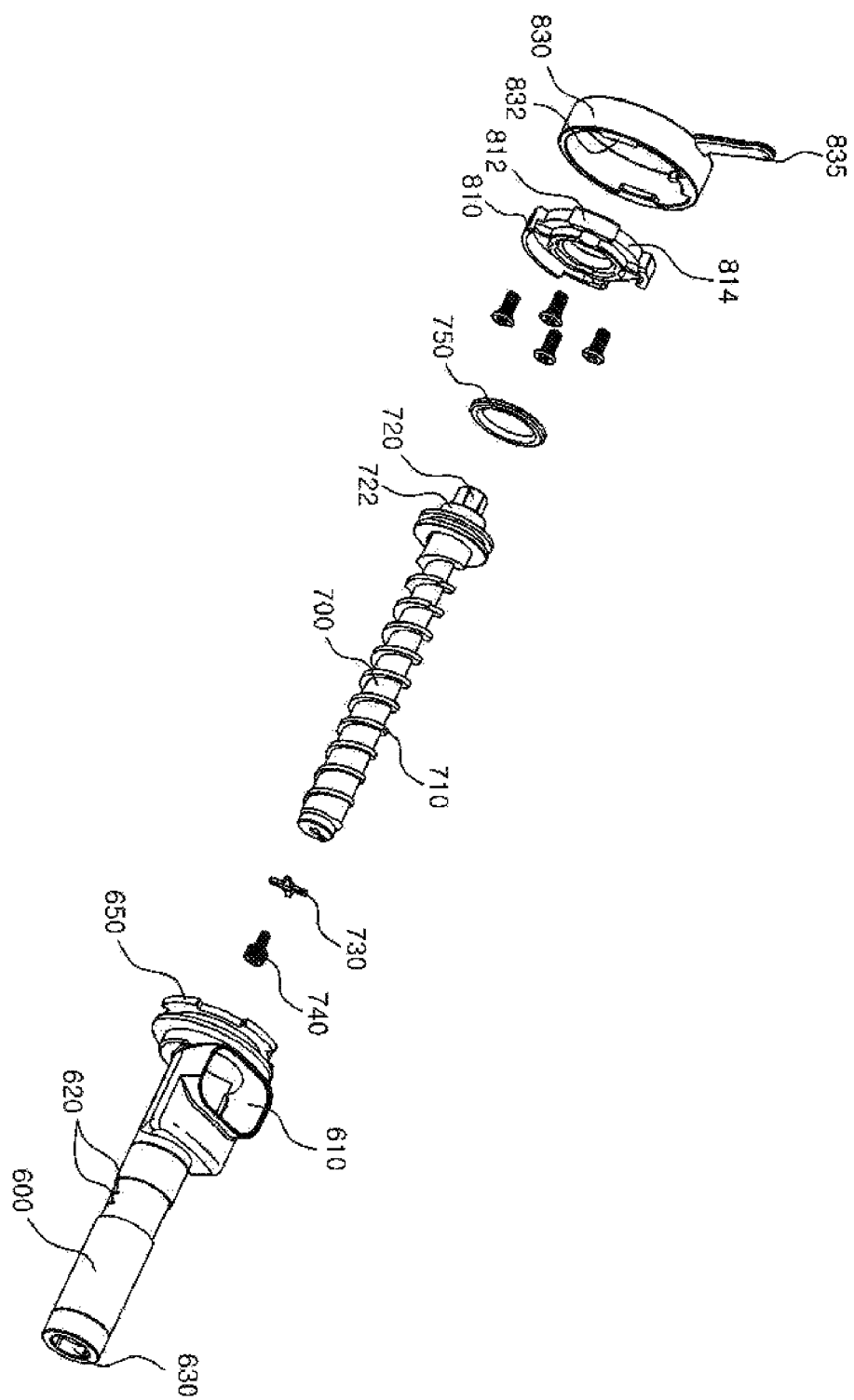
FIG. 8 is an exploded perspective view showing fastening means for fastening the shell to a screw shaft and the shell to the main body housing of the oil extractor according to the present invention.
Figure 9:
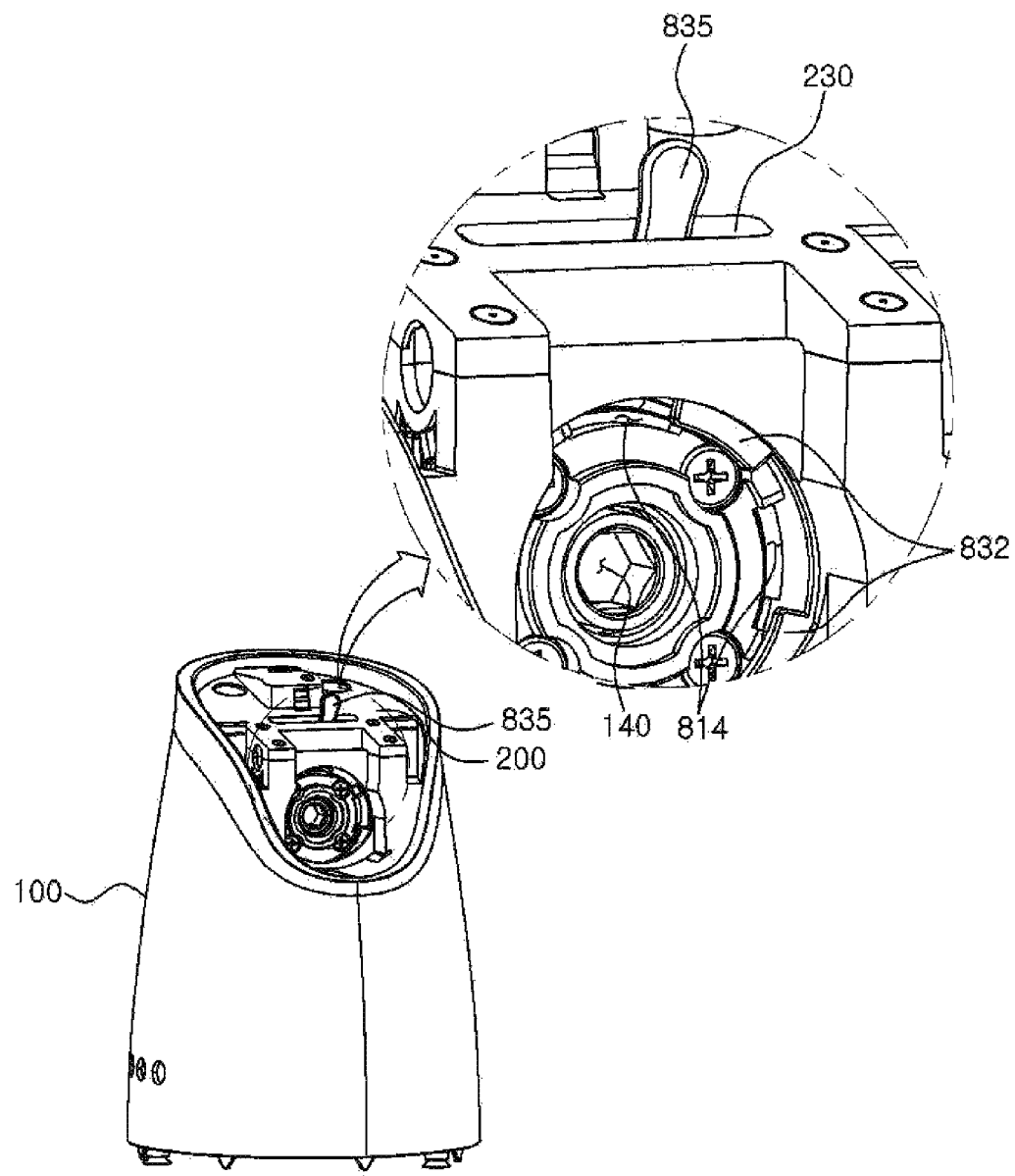
FIG. 9 is a perspective view showing the operating state of the fastening means when the shell is in the unfastening state thereof.
Figure 10:
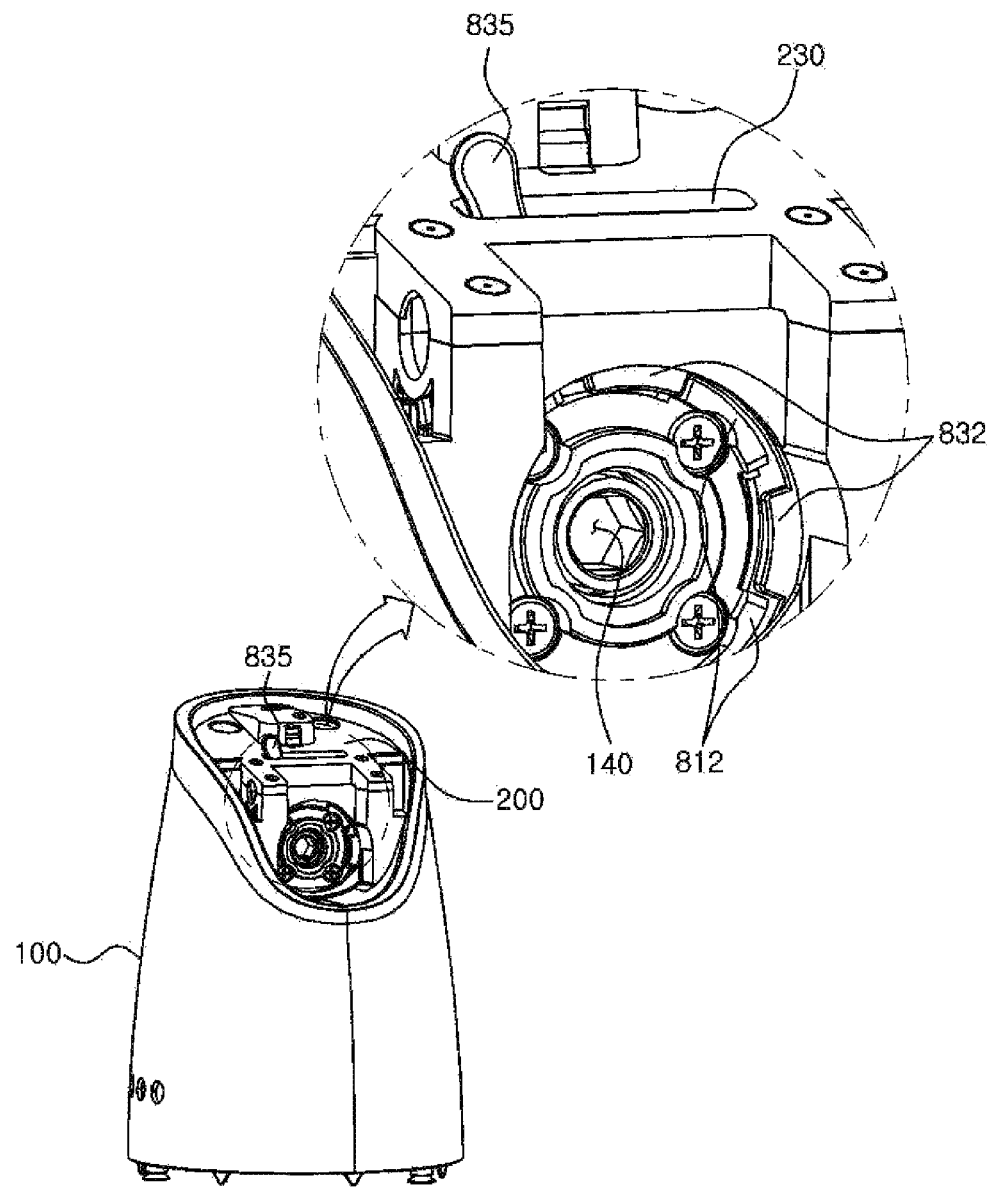
FIG. 10 is a perspective view showing the operating state of the fastening means when the shell is in the fastening state thereof.

FIG. 8 is an exploded perspective view showing fastening means for fastening the shell to the screw shaft and the shell to the main body housing of the oil extractor according to the present invention, FIG. 9 is a perspective view showing the operating state of the fastening means when the shell is released from the fastening state thereof, and FIG. 10 is a perspective view showing the operating state of the fastening means when the shell is in the fastening state thereof.

In this case, FIGS. 9 and 10 show the state wherein the shell 600 is removed for the convenience of the description.

The shell 600 has a generally hollow cylindrical shape for accommodating the screw shaft 700 thereinto and has a given length corresponding to the length of the screw shaft 700.

The shell 600 has the material inlet 610 formed on the top of the left side portion thereof in such a manner as to insert the inlet 310 (See FIG. 2) of the feed hopper 300 thereinto to introduce the material thereinto.

The shell 600 has oil discharge slits 620 formed on the underside of the center thereof to discharge the oil separated from the grains.

Further, the shell 600 has a remnant outlet 630 formed on the front end (right side end) thereof to discharge the remnants of the grains from which the oil is separated to the outside.

On the other hand, the shell 600 has fastening means insertion protrusions 650 formed on the rear end (left side end) periphery thereof, which will be discussed later.

The screw shaft 700 has a shape of a bar which becomes large in diameter as it goes toward the front (right side) thereof and a screw-shaped blade 710 formed on the outer peripheral surface thereof in a longitudinal direction thereof to compressingly move the grain material therealong.

The screw shaft 700 has the shank portion 720 formed on one end (left side end) thereof in such a manner as to be coupled to the motor 110 (See FIG. 2).

The shank portion 720 is exposed to the outside when the screw shaft 700 is coupled to the shell 600 and has a polygonal shape for transferring the driving force of the motor 110 to the shell 600.

As mentioned above, the gearbox 120 (See FIG. 2) is coupled to the top end of the motor 110 so as to control the revolutions per minute and has the coupling hole 122 formed to insert the shank portion 720 thereinto.

Since the shank portion 720 has the polygonal shape, accordingly, the coupling hole 122 also has a polygonal shape corresponding to the shank portion 720.

A stepped portion 722 is formed on one side of the shank portion 720 and is thus supported against the end portion of the coupling hole 122 in the state where the shank portion 720 is coupled to the coupling hole 122, so that upon the operation of the oil extractor 10, a backward (left side) movement of the screw shaft 700 is prevented to allow the screw shaft 700 to be spaced apart from the shell 600 by a given distance, thereby constantly maintaining the oil extraction efficiency (See FIG. 2).

On the other hand, a sealing member 750 is located between the screw shaft 700 and the shell 600, and further, a crushing screw 730 and a crushing protrusion 740 are located on the other end (right side end) of the screw shaft 700 to finely crush the remnants.

Referring to FIGS. 1, 2 and 8, the grains introduced from the material inlet 630 pass through the space between the blade 710 of the screw shaft 700 and the shell 600 and move to the front side (right side of the drawing) by means of the blade 710. At this time, the shell 600 is heated by means of the heater block 530 heated by the heater 520 of the heating part 510, so that the grains are roasted and at the same time extracted by the inner peripheral surface of the shell 600 to the form of oil.

Like this, the oil separated from the grains by means of the shell 600 and the screw shaft 700 flows along the internal flow of the shell 600 and is then discharged to the outside through the oil discharge slits 620. Next, the discharged oil passes through the accommodation groove 552 of the shell cover 500 and is then collected to the oil storage container 910.

On the other hand, the remnants of the grains from which the oil is separated move to the front side (right side) by means of the blade 710 of the screw shaft 700 and are then discharged to the outside through the remnant outlet 630. Next, the remnants are collected to the remnant storage container 920.

The shell cover 500 has an oil discharge indicator 554 and a remnant discharge indicator 556 located on the outer peripheral surfaces corresponding to the positions where the oil is separated and the remnants are discharged, so that the oil storage container 910 and the remnant storage container 920 can be disposed correspondingly to the oil discharge indicator 554 and the remnant discharge indicator 556.

The fastening means detachably couples the shell 600 and the main body housing 100 to each other, and as shown, the fastening means includes a buckle base 810 and a buckle 830 disposed around the through-hole 140 formed in the interior of the main body housing 100 and the insertion protrusions 650 formed on one end periphery of the shell 600.

The buckle base 810 is fixedly disposed at the position corresponding to the through-hole 140 (See FIG. 5) formed in the interior of the main body housing 100 and is hollow in interior in such a manner as to pass the shank portion 720 of the screw shaft 700 therethrough, while having a plurality of guide protrusions 812 and grooves 814 formed alternately along the outer peripheral surface thereof. That is, one guide groove 814 is located between the neighboring guide protrusions 812 so that the guide grooves 814 and the guide protrusions 812 are formed alternately.

The buckle 830 is adapted to surround the buckle base 810. Also, the buckle 830 is hollow in interior and has a plurality of fastening protrusions 832 protruding inwardly from the outer peripheral surface thereof in such a manner as to be spaced apart from each other by a given distance.

The buckle 830 rotatably moves along the outer peripheral surface of the buckle base 810 to a third position (See FIG. 10) at which the shell 600 is fastened (coupled) to the main body housing 100 and to a fourth position (See FIG. 9) at which the fastening of the shell 600 is released.

Further, the lever 835 protrudes from the top end of the buckle 830 to rotatably move the buckle 830 to the third position and the fourth position, and the top end portion of the lever 835 is exposed to the outside of the main body housing 100 through the lever through-hole 230 of the main body housing 200.

Accordingly, the lever 835 is manipulated by the user to move the position of the buckle 830, so that the shell 600 is fastened or unfastened to or from the main body housing 100.

The insertion protrusions 650 protrude outwardly from the outer peripheral surface of one end portion of the shell 600 in such a manner as to be spaced apart from each other by a given distance and are thus inserted into the guide grooves 814 of the buckle base 810.

The number of insertion protrusions 650, the number of fastening protrusions 832 of the buckle 830, and the number of guide grooves 814 of the buckle base 810 are the same as each other.

Accordingly, as shown in FIG. 9, the lever 835 is located at one side (right side) when the buckle 830 is at the fourth position (unfastening state), and at this time, the fastening protrusions 832 of the buckle 830 and the guide protrusions 812 of the buckle base 810 are located at the corresponding positions to each other, so that the guide grooves 814 of the buckle base 810 are exposed to insert the insertion protrusions 650 of the shell 600 thereinto to allow the shell 600 to be coupled to the main body housing 100 or to allow the coupled shell 600 to be drawn and separated from the main body housing 100.

Further, as shown in FIG. 10, the lever 835 is located at the other side (left side) when the buckle 830 is at the third position (fastening state), and at this time, the buckle 830 rotates to allow the fastening protrusions 832 to be located at the positions facing the insertion protrusions 650 of the shell 600 inserted into the guide grooves 814, so that the movements of the insertion protrusions 650 are constrained to allow the shell 600 to be fastened to the main body housing 100.

According to the present invention, therefore, the shell cover 500 having the heating part 510 is foldable, and in the state where the shell cover 500 is folded, accordingly, the shell 600 and the screw shaft 700 are fastened or unfastened to or from the main body housing 100 only by means of the manipulation of the lever 835, so that it is very convenient and easy to clean or repair the interior of the shell 600.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention relates to the oil extractor for compressing grains through the screw shaft to isolatedly discharge oil and remnants, which is useful in various industrial fields.

The invention claimed is:

1. An oil extractor comprising:
a main body housing having a motor embedded therein;
a feed hopper detachably coupled to a top end periphery of the main body housing to feed grains for oil extraction;
a shell detachably coupled to one side of the main body housing in such a manner as to communicate with a lower end of the feed hopper to receive the grains for oil extraction from the feed hopper;
a screw shaft adapted to be inserted into the shell and having an end portion passing through one side of the main body housing in such a manner as to be coupled to the motor;
a fastening means for detachably coupling the shell to the main body housing; and
a shell cover adapted to surround the shell, having a groove formed on a lower portion thereof to accommodate the shell thereinto, and supported against the main body housing in such a manner as to be movable in position between a first position at which the shell is covered and a second position at which the shell is exposed.

2. The oil extractor according to claim 1, wherein the shell cover comprises a heating part disposed in the interior thereof to heat the shell.

3. The oil extractor according to claim 2, wherein the heating part comprises a heater as a heating source and a heater block adapted to surround the heater in such a manner as to come into contact with the heater, and when the shell cover is at the first position, an underside surface of the heater block comes into contact with at least a portion of the top peripheral surface of the shell, so that the heat of the heater is transferred to the shell.

4. The oil extractor according to claim 3, wherein the underside surface of the heater block has a hemispherical shape so that the heater block covers the upper hemispherical portion of the shell.

5. The oil extractor according to claim 1, wherein the fastening means comprises:
a cylindrical buckle base fixedly disposed around a through-hole formed one side portion of the main body housing and having a plurality of guide grooves formed spaced apart from each other by a given distance along an outer peripheral surface thereof;
a cylindrical buckle rotatably moving along the outer peripheral surface of the buckle base to a third position at which the shell is fastened to the main body housing and to a fourth position at which the fastening of the shell is released and having a plurality of fastening protrusions protruding inwardly from the outer peripheral surface thereof in such a manner as to be spaced apart from each other by a given distance; and
insertion protrusions protruding from one end portion of the shell in a circumferential direction in such a manner as to be spaced apart from each other by a given distance and
inserted into the plurality of guide grooves of the buckle base,
and when the buckle is at the third position, the plurality of fastening protrusions is located at a position facing the plurality of insertion protrusions, so that a movement of the plurality of insertion protrusions is constrained.

6. The oil extractor according to claim 5, wherein the buckle comprises a lever protruding from one side of the outer peripheral surface thereof so as to perform the rotatable movements of the buckle to the third position and to the fourth position, and a portion of the upper end portion of the lever is exposed to an outside of the top end of the main body housing so as to be manipulated by a user.

* * * * *